(12) United States Patent
Choi et al.

(10) Patent No.: US 9,788,308 B2
(45) Date of Patent: Oct. 10, 2017

(54) MULTIBAND-OPERATION IN WIRELESS COMMUNICATION SYSTEMS

(71) Applicant: Intel Deutschland GmbH, Neubiberg (DE)

(72) Inventors: Hyung-Nam Choi, Hamburg (DE); Maik Bienas, Braunschweig (DE)

(73) Assignee: Intel Deutschland GmbH, Neubiberg (DE)

( * ) Notice: Subject to any disclaimer, the term of this patent is extended or adjusted under 35 U.S.C. 154(b) by 284 days.

(21) Appl. No.: 14/179,717

(22) Filed: Feb. 13, 2014

(65) Prior Publication Data

US 2014/0161077 A1    Jun. 12, 2014

Related U.S. Application Data

(63) Continuation of application No. 12/366,025, filed on Feb. 5, 2009, now abandoned.

(51) Int. Cl.
*H04W 4/00* (2009.01)
*H04W 72/04* (2009.01)

(52) U.S. Cl.
CPC ................. *H04W 72/042* (2013.01)

(58) Field of Classification Search
USPC .......... 370/329, 330, 331, 333, 338
See application file for complete search history.

(56) References Cited

U.S. PATENT DOCUMENTS

2008/0192847 A1    8/2008  Classon et al.
2009/0300456 A1*  12/2009  Pelletier ............... H04L 1/1812
                                                    714/749
2010/0061345 A1    3/2010  Wengerter et al.
2010/0118720 A1*   5/2010  Gauvreau ........... H04W 72/048
                                                    370/252
2010/0142455 A1*   6/2010  Imamura ............ H04W 52/146
                                                    370/329

(Continued)

FOREIGN PATENT DOCUMENTS

CN         101360081         2/2009

OTHER PUBLICATIONS

Office Action received for Chinese Patent Application No. 2010101381750, mailed Jan. 27, 2014, 26 pages including 17 pages English translation.

(Continued)

*Primary Examiner* — Zewdu A Beyen

(57) ABSTRACT

A method and wireless communication network that employs adapted control channel information to facilitate centralized and distributed scheduling of network resources for a network with mobile communication devices of differing bandwidth capabilities are described. The method includes transmitting control channel data of a first format over a control channel, wherein the control channel data of the first format conveys information related to data transmitted within a first frequency band and transmitting control channel data of a second format over the control channel, wherein the control channel data of the second format conveys information related to data transmitted over one or more frequency bands, the one or more frequency bands having a combined bandwidth equal or greater than the first frequency band.

14 Claims, 7 Drawing Sheets

(56) References Cited

U.S. PATENT DOCUMENTS

| | | | | |
|---|---|---|---|---|
| 2010/0227569 A1* | 9/2010 | Bala | ................. | H04L 5/0007 455/73 |
| 2010/0303011 A1* | 12/2010 | Pan | ................. | H04L 5/001 370/328 |
| 2012/0069764 A1* | 3/2012 | Classon | ................. | H04L 5/0007 370/252 |

OTHER PUBLICATIONS

Office Action received for Chinese Patent Application No. 201410144344.X, dated Feb. 20, 2017, 7 pages (untranslated).
"3rd Generation Partnership Project; Technical Specification Group Radio Access Network; Evolved Universal Terrestrial Radio Access (E_UTRA); Multiplexing and channel coding, (Release 8)", 3GPP TS 36.212, V8.5.0, (Dec. 2008), 8 pages (author unknown).

\* cited by examiner

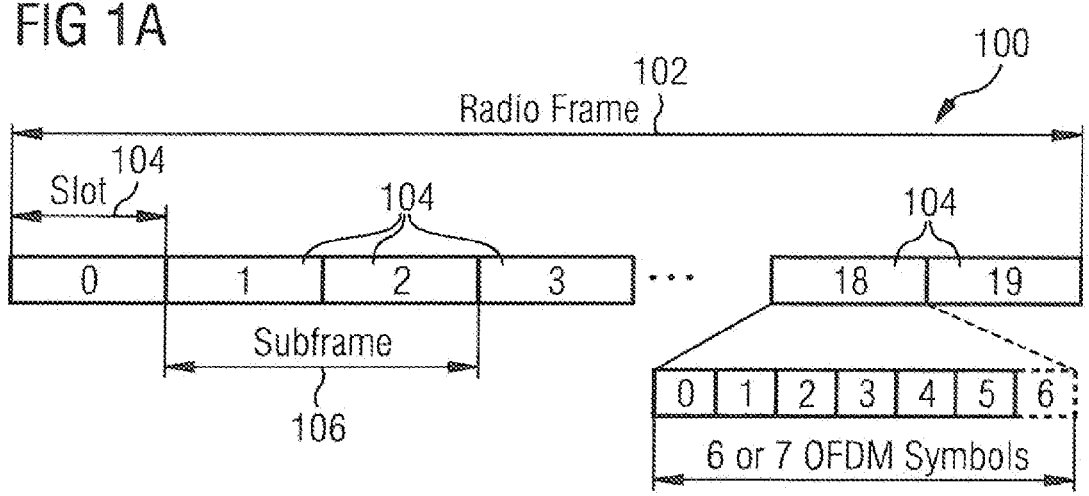
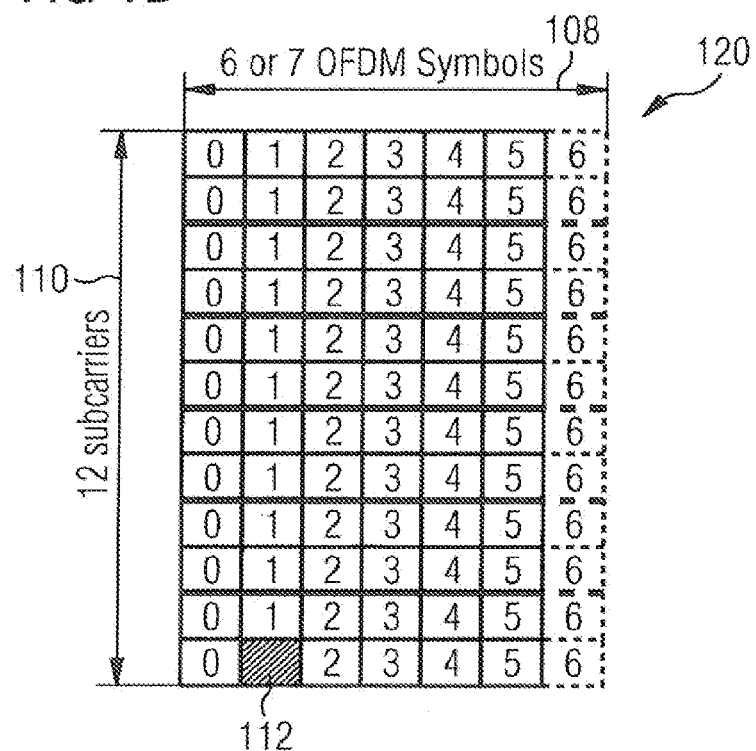

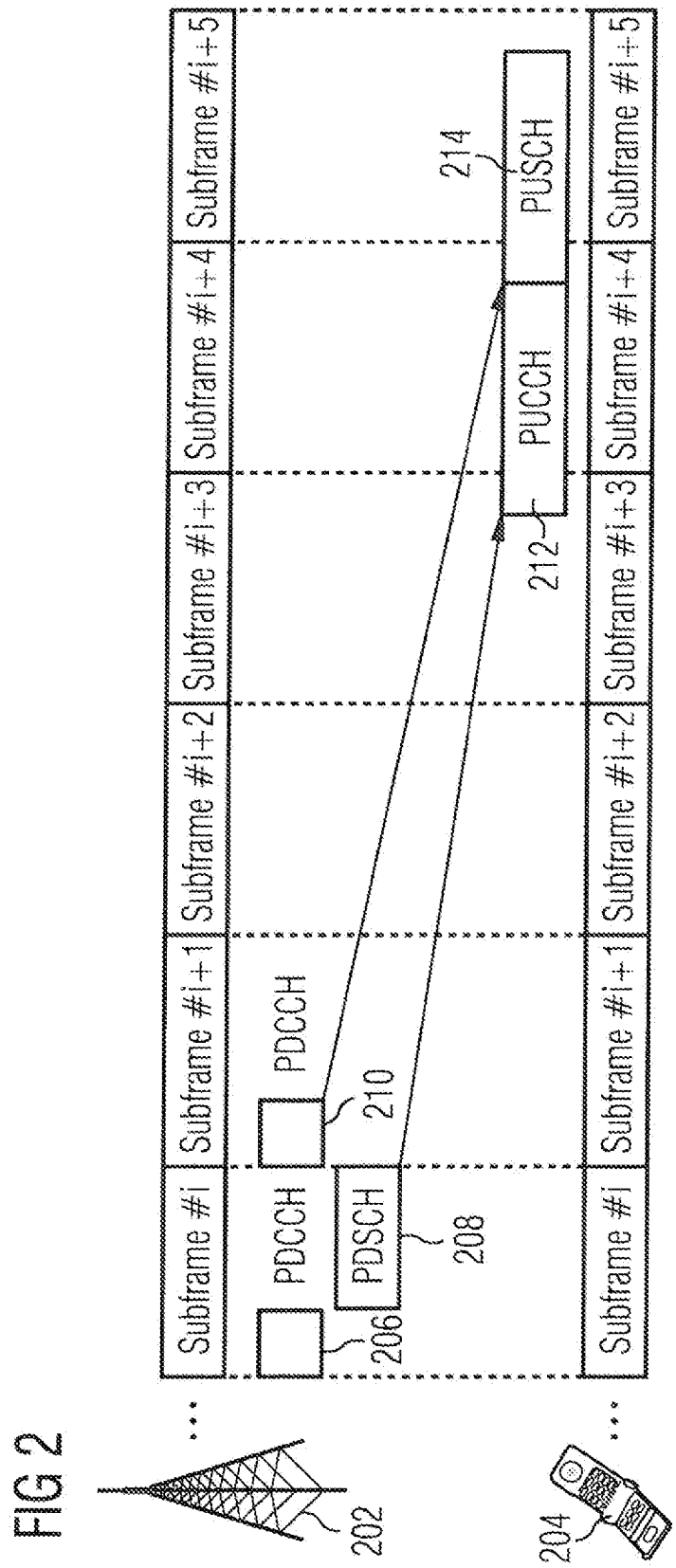

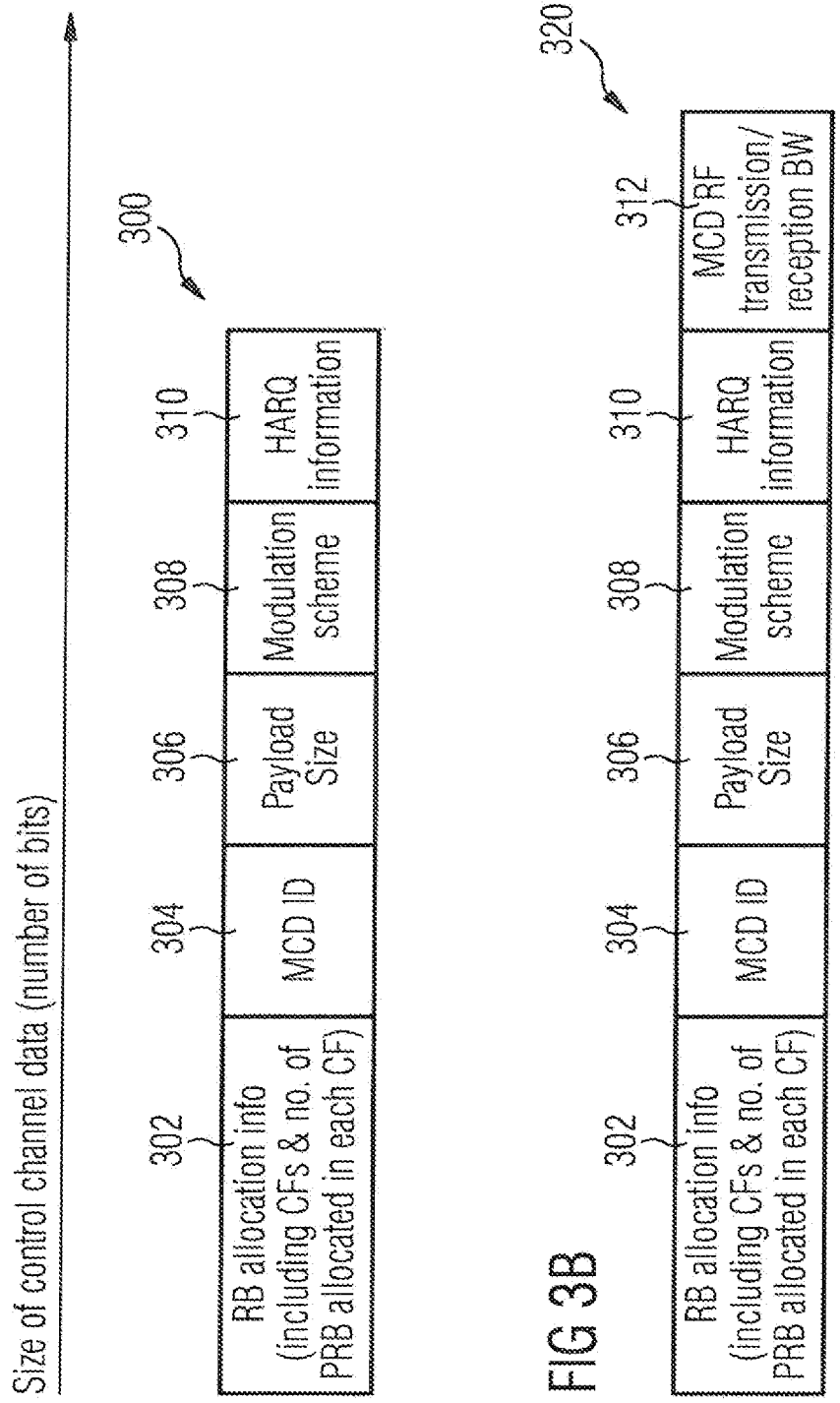

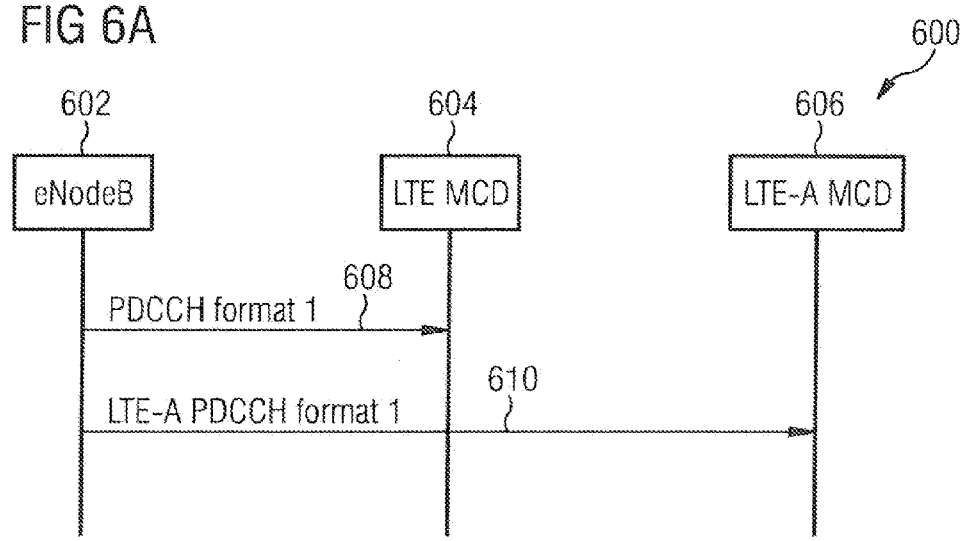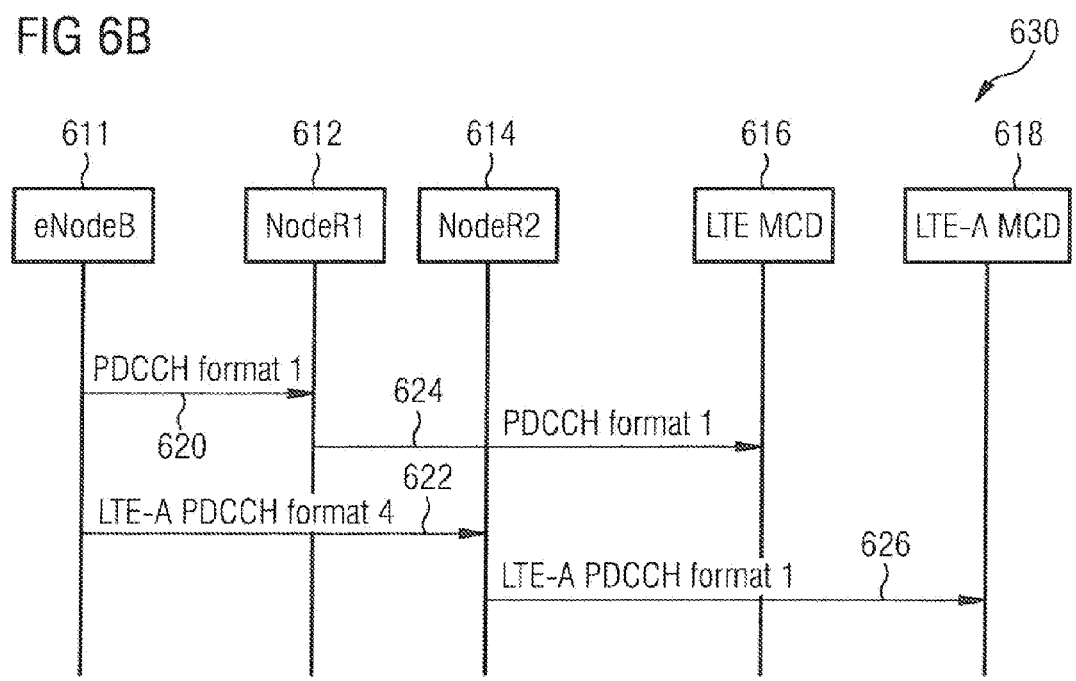

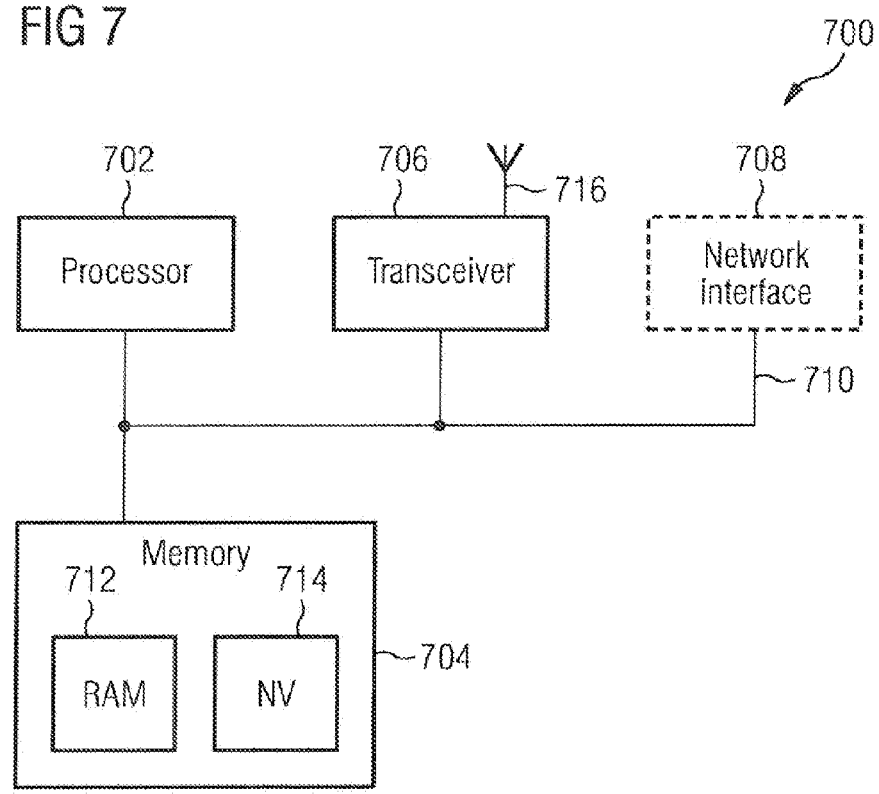

MULTIBAND-OPERATION IN WIRELESS COMMUNICATION SYSTEMS

CROSS-REFERENCE TO RELATED APPLICATIONS

This application is a continuation of, claims the benefit of and priority to, previously filed U.S. patent application Ser. No. 12/366,025 entitled "MULTIBAND-OPERATION IN WIRELESS COMMUNICATION SYSTEMS" filed on Feb. 5, 2009, the subject matter of which is hereby incorporated by reference in its entirety.

BACKGROUND OF THE INVENTION

Implementing the next generation of mobile communication standards will require improving system capacity and spectral efficiency in order to increase data transmission rate beyond current levels. For example, Long Term Evolution-Advanced (LTE-A) is a current topic focused on technologies to further evolve the Long Term Evolution (LTE) air interface in terms of spectral efficiency, cell edge throughput, coverage, and latency. In addition to improving the LTE air interface, another important consideration is designing a communication system compatible with both LTE and LTE-A equipment.

For example, LTE networks employ packet-scheduling, which dynamically allocates resources to mobile communication device through time and frequency domain scheduling over a shared physical control channel. Current LTE networks, however, are unable to support mobile communication device having higher bandwidth capabilities than LTE mobile communication device. Thus, a network capable of supporting mobile communication device with different bandwidth capabilities is desired.

SUMMARY OF THE INVENTION

Embodiments of the invention provide methods, wireless communication networks, and base stations that transmit control channel data of a first format over a control channel, wherein the control channel data of the first format conveys information related to data transmitted within a first frequency band and transmit control channel data over the control channel of a second format, wherein the control channel data of the second format conveys information related to data transmitted over one or more frequency bands, the one or more frequency bands having a combined bandwidth equal or greater than the first frequency band.

Embodiments further provide an apparatus comprising a transceiver, a processor, and a memory unit communicatively connected to the processor. The memory unit includes computer code that when executed by the processor causes the wireless communication device to receive and interpret control channel data, wherein the control channel data includes a carrier frequency field and a physical resource block field.

These and other features of the invention will be better understood when taken in view of the following drawings and a detailed description.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A shows an example frame structure for use with embodiments of the invention;

FIG. 1B shows an example physical resource block for use with embodiments of the invention;

FIG. 2 shows an example message scheduling chart for use with embodiments of the invention;

FIGS. 3A and 3B show, respectively, control channel data structure in accordance with an embodiment of the invention;

FIGS. 6A and 6B show, respectively, message sequence charts for multiband-operation in an LTE-A communication system in accordance with an embodiment of the invention; and FIG. 7 shows a block diagram of an example architecture for a wireless communication device for use with embodiments of the invention.

DETAILED DESCRIPTION OF ILLUSTRATIVE EMBODIMENTS

Figure 4:
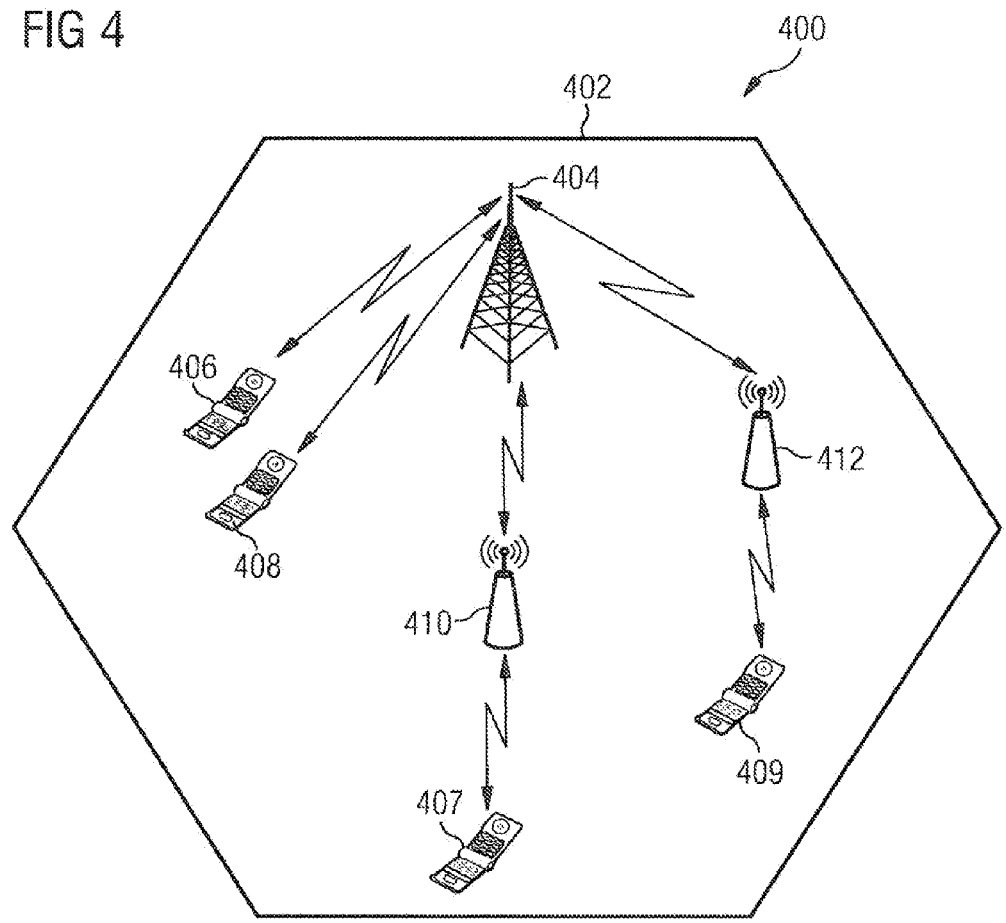
FIG. 4 shows an architectural overview of an example network architecture in accordance with an embodiment of the invention.

As detailed below, embodiments of the invention provide adapting control channel information to facilitate centralized and distributed scheduling of network resources for a network with mobile communication devices of differing bandwidth capabilities.

Example network interfaces for use with embodiments of the invention, LTE and LTE-A support multiple access methods for uplink transmissions (from mobile communication device to base station) and downlink transmissions (from base station to mobile communication device). For downlink transmission, Orthogonal Frequency Division Multiple Access (OFDMA) in combination with Time Division Multiple Access (TDMA) has been selected for Third Generation Partnership Project (3GPP) Long Term Evolution (LTE) air interface. OFDMA in combination with TDMA (OFDMA/TDMA) is a multicarrier, multiple access method in which a mobile communication device (MCD), such as a mobile telephone, is provided with a defined number of subcarriers in the frequency spectrum for a defined transmission time for the purpose of data transmission. That is, a MCD is assigned network resources in both the frequency and time domain. Uplink data transmission is based on Single Carrier Frequency Division Multiple Access (SC-FDMA) in combination with TDMA.

LTE and LTE-A also support the following duplexing methods: TDD, full-duplex FDD and half-duplex FDD. Full-duplex FDD uses two separate frequency bands for uplink and downlink transmissions such as media data or control information. Full-duplex FDD allows for uplink and downlink transmissions to occur simultaneously. Half-duplex FDD also uses two separate frequency bands for uplink and downlink transmissions, but transmissions do not overlap in time. TDD uses the same frequency band for both uplink and downlink transmissions. Although embodiments are described below in a full-duplex FDD environment, half-duplex FDD and TDD implementations are within the scope of the invention.

FIG. 1A shows an example frame structure for use with embodiments of the invention. Frame structure 100 is applicable to full-duplex FDD, half-duplex FDD, OFDMA, and SC-FDMA. Each radio frame 102 is 10 ms long and consists of 20 slots 104 of length 0.5 ms, numbered from 0 to 19. Subframe 106 is defined as two consecutive slots. For FDD, 10 subframes are available for downlink and uplink transmission in each 10 ms interval. Depending on the slot format, a slot 104 consists of 6 or 7 OFDMA symbols in downlink transmission and 6 or 7 SC-FDMA symbols in uplink transmissions. The OFDMA and SC-FDMA symbols contain data as well as control information assigning network resources to a user.

FIG. 1B shows an example resource block for use with embodiments of the invention. Physical resource block 120 is the smallest unit of allocation assigned by a base station or relay node for transmitting uplink or downlink data. Downlink physical resource block 120 includes a matrix of 12 subcarriers 110 by 6 or 7 OFDM symbols 108. A resource element 112 corresponds to one OFDM symbol and one subcarrier. A typical transmission in an LTE network will include multiples of 12 subcarriers being simultaneously transmitted, and thus many resource blocks are also being transmitted simultaneously.

In some embodiments, an eNodeB signals the allocation of physical radio resources for data transmission on a Downlink Shared Channel (DL-SCH) and an Uplink Shared Channel (UL-SCH), through a control channel. As used herein, a control channel is a communication channel that carries at least control information. Examples of control information include, but are not limited to, number of allocated resource blocks in the frequency domain, modulation and coding scheme, transmit power control commands, Hybrid Automatic Repeat ReQuest process number, and Positive Acknowledgements/Negative Acknowledgements (HARQ ACK/NAK). Scheduling and data transport between MCD and a base station or a relay node in an LTE or LTE-A network occur over physical channels.

The Physical Uplink Shared Channel (PUSCH) carries user and control data on a UL-SCH transport channel. Resources for the PUSCH are allocated on a sub-frame basis.

The Physical Uplink Control Channel (PUCCH) is a physical channel only. That is, no logical or transport channels are mapped to this channel. It carries the control information such as Hybrid Automatic Repeat ReQuest Positive Acknowledgements/Negative Acknowledgements (HARQ ACK/NAK) in response to downlink transmissions on PDSCH.

The Physical Downlink Shared Channel (PDSCH) is used mostly for data and multimedia transport by carrying user and control data on DL-SCH. It occupies the OFDMA symbols in a subframe not occupied by Physical Downlink Control Channel.

The Physical Downlink Control Channel (PDCCH) carries the control information related to downlink transmissions such as resource allocation of DL-SCH. It also carries the control information related to uplink transmissions such as resource allocation of UL-SCH and Transmit Power Control commands for PUCCH and PUSCH. Due to the different types of control information to be transmitted over the PDCCH, the control information has been grouped into so-called downlink control information (DCI) formats. For example, a PDCCH with DCI format 0 is used for the scheduling resources for the PUSCH.

In some embodiments, the PDCCH is used by an eNodeB to inform the MCD about the resource allocation of PUSCH and PDSCH. The MCD can determine whether the resource allocation is intended for it or not by detecting its implicitly encoded identity. In LTE a number of PDCCH formats, also referred to as DCI formats, have been specified. The payload size for each DCI format is variable and depends mainly on the cell bandwidth.

Table 1 shows some examples of the DCI formats.

TABLE 1

DCI formats used for scheduling PUSCH and PDSCH in FDD

| PDCCH formats | Purpose | Payload size (FDD) |
| --- | --- | --- |
| DCI format 0 | PUSCH scheduling | Range: 19 . . . 27 bits |
| DCI format 1 | Scheduling of one PDSCH codeword | Range: 24 . . . 42 bits |
| DCI format 1A | Compact scheduling of one PDSCH codeword | Range: 21 . . . 29 bits |
| DCI format 1B | Compact scheduling of one PDSCH codeword with precoding information | Range: 22 . . . 32 bits |
| DCI format 1C | Very compact scheduling of one PDSCH codeword | Range: 8 . . . 15 bits |
| DCI format 1D | Compact scheduling of one PDSCH codeword with precoding and power offset information | Range: 22 . . . 32 bits |
| DCI format 2 | PDSCH scheduling in closed-loop spatial multiplexing mode | Range: 28 . . . 57 bits |
| DCI format 2A | PDSCH scheduling in open-loop spatial multiplexing mode | Range: 25 . . . 53 bits |

FIG. 2 shows an example message scheduling chart for use with embodiments of the invention. Base station 202 transmits over PDCCH 206 to MCD 204 at Subframe #i indicating that the base station will transmit data over PDSCH 208 intended for MCD 204. Once the data has been received from PDSCH 208, a HARQ ACK/NAK is required to be transmitted by MCD 204 at Subframe #i+4 over the PUCCH 212. At Subframe #i+1, base station 202 transmits over PDCCH 210 with DCI format 0 to MCD 204 indicating to MCD 204 to adjust PUSCH 214 transmission scheduled for subframe #i+5.

The PDCCH formats as currently specified for LTE, however, cannot be applied to LTE-A as they do not support the resource allocation of bandwidths larger than 20 MHz. LTE-A requires resource allocation of bandwidths larger than 20 MHz, for example up to 100 MHz of bandwidth.

FIG. 3A shows control channel data structure 300 in accordance with an embodiment of the invention. Physical resource allocation information element 302 includes information as to which carrier frequencies (CFs) are to be used in an uplink or downlink transmission and the number of physical resource blocks (PRBs) allocated to each carrier frequency. These two elements enable an LTE-A network to assign PRBs over multiple carrier frequencies to an LTE-A MCD. MCD ID element 304 includes an identification number of a MCD. Payload size element 306 includes transport block size. Modulation scheme element 308 includes information about which modulation scheme will be used, e.g., Quadrature Phase-Shift Keying (QPSK), 16-Quadrature Amplitude Modulation (QAM), 64-QAM. HARQ information element 310 is implemented to send positive acknowledgement (ACK) or negative acknowledgement (NAK) signals, indicating whether a MCD received valid data or not.

Thus, one embodiment of the invention adapts the PDCCH structure to facilitate scheduling LTE and LTE-A MCDs. The physical resource allocation information element of PDCCH formats are adapted to include information about the carrier frequency assigned to the LTE-A MCD in uplink or downlink transmission and the number of resource blocks allocated in each associated frequency band.

FIG. 3B shows control channel data structure 320 in accordance with another embodiment of the invention. In some embodiments, control channel data structure 320 is a PDCCH. Control channel data structure 320 shares elements 302-310 (i.e., physical resource allocation information element 302, MCD ID element 304, payload size element 306, modulation scheme element 308, and HARQ information element 310) with control channel data structure 300, but also includes RF transmission (for uplink) and/or RF reception (for downlink) bandwidth capabilities of an LTE-A MCD at element 312. Element 312 allows an LTE-A network to implement a distributed scheduling of network resources. That is, both base stations and relay nodes may allocate network resources to MCDs since a bandwidth capability of a MCD is known by the network.

It will be understood that although specific control channel data structures were recited in describing FIGS. 3A and 3B, FIGS. 3A and 3B are only two possible configurations within the scope of the invention and that there may be many variations or additions to this configuration. For example, carrier frequency and physical resource block information may be contained in separate element blocks and not in Physical resource allocation information element 302.

FIG. 4 shows an architectural overview of an example network architecture in accordance with an embodiment of the invention. Network 400 includes base station 404, which provides coverage for cell 402. In some embodiments, base station 404 is an LTE-Advanced eNodeB. Base station 404 supports direct connections with LTE MCDs 406 and LTE-A MCDs 408. Relay nodes 410 and 412, sometimes referred to as NodeRs, may be deployed in the cell for providing additional coverage at cell-edge or coverage holes. Relay nodes 410 and 412 may include a process and a memory unit. LTE MCD 407 and LTE-A MCD 409 communicate with base station 404 via uplink and downlink transmissions through the intermediate relay nodes 410 and 412.

The scheduling of uplink and downlink transmissions for LTE MCDs 406 and 407 may be performed by base station 404 applying an LTE physical control channel structure, as described in detail above in Table 1. But for scheduling transmissions for LTE-Advanced MCDs 408 and 409, current LTE physical control channel structures cannot be applied and need to be modified. Current LTE physical control channel structures do not support bandwidths larger than 20 MHz, flexible spectrum usage, or spectrum sharing, all of which an LTE-A MCD and network may be capable of.

Moreover, the scheduling of uplink and downlink transmissions for MCDs 407 and 409 may be performed by relay nodes 410 and 412. For example, relaying or multi-hop communication is one way to improve the coverage, throughput, and capacity for existing and future cellular communication systems at low deployment costs. In a multi-hop embodiment, relay nodes 410 and 412 are deployed in the coverage area of the macro cell 402 for providing additional coverage at cell edge or coverage holes. In some embodiments, relay nodes 410 and 412 are adapted to function like a base station for MCDs 407 and 409 and/or adapted to function like a MCD for base station 404.

In one embodiment, base station 404 is an LTE-A eNodeB, which supports direct connections with LTE MCD 406 and LTE-A MCD 408. Further, connections with LTE MCD 407 and LTE-A MCD 409 are supported through relay nodes 410 and 412, respectively.

In some embodiments, LTE MCD 406 and LTE MCD 407 support a maximum RF transmission/reception bandwidth of 20 MHz and operate only in 20 MHz uplink and downlink bandwidths.

In some embodiments, LTE-A MCD 408 and LTE-A MCD 409 support a maximum RF transmission/reception bandwidth of 60 MHz and operate in a combined 25 MHz uplink band. In some embodiments, LTE-A MCD 408 and LTE-A MCD 409 operate in an overall 65 MHz downlink band. In some embodiments, the PDCCHs are transmitted in a frequency band shared by all MCDs (LTE MCD 406, LTE MCD 407, LTE-A MCD 408, and LTE-A MCD 409).

Embodiments within the scope of the present invention encompass several types of relay nodes, which are categorized according to the functionality, mobility, and processing capabilities of the relay node.

A relay node may be categorized by the protocol layers the relay affects when relaying a signal, An L1 relay sends an amplified copy of its received signal and thus only affects the physical layer of an LTE or LTE-A network. An L2 relay receives and decodes signals up to an L2 protocol level and transmits a re-encoded signal. Thus, an L2 relay affects the physical layer and L2 protocol layers (e.g. MAC and RLC). An L3 relay affects the physical, L2, and L3 protocol layers and receives and forwards IP packets.

A relay node may be also categorized according to the mobility of the relay node. A Fixed Relay Node is permanently installed at a fixed location. A Nomadic Relay Node is intended to function from a location that is fixed for only periods of time. A Mobile Relay node is designed to function while in motion.

A relay node may also be classified as an Infrastructure Relay Node or a UE Relay Node.

As the above classifications illustrate, incorporating relaying functionality into the LTE-A system impacts both MCD and base stations. One issue is the scheduling of physical radio resources for uplink and downlink transmission. For example, in a distributed scheduling scheme, the resource allocation is determined by a relay node in cooperation with a base station. That is, the relay node is able to change and adapt the resource allocation in the frequency and/or time domain if required. The PDCCH. formats as currently specified for LTE cannot support a distributed scheduling mode in an LTE-A network.

Thus, in an embodiment of the invention, the PDCCH structure is adapted to include the RF transmission and reception capability of LTE-A MCDs. Distributed scheduling between base stations and relay stations is supported by such a PDCCH structure because a relay station will be able to change and adapt network resources in ways that are within the RF transmission and reception capability of an LTE-A MCD. The physical resource allocation information element of PDCCH formats are adapted to include information about the RE transmission/reception bandwidth capability of an LTE-Advanced MCD, information about the carrier frequency assigned to the MCD in uplink and downlink transmission, and the number of resource blocks allocated in the associated frequency band.

Figure 5:
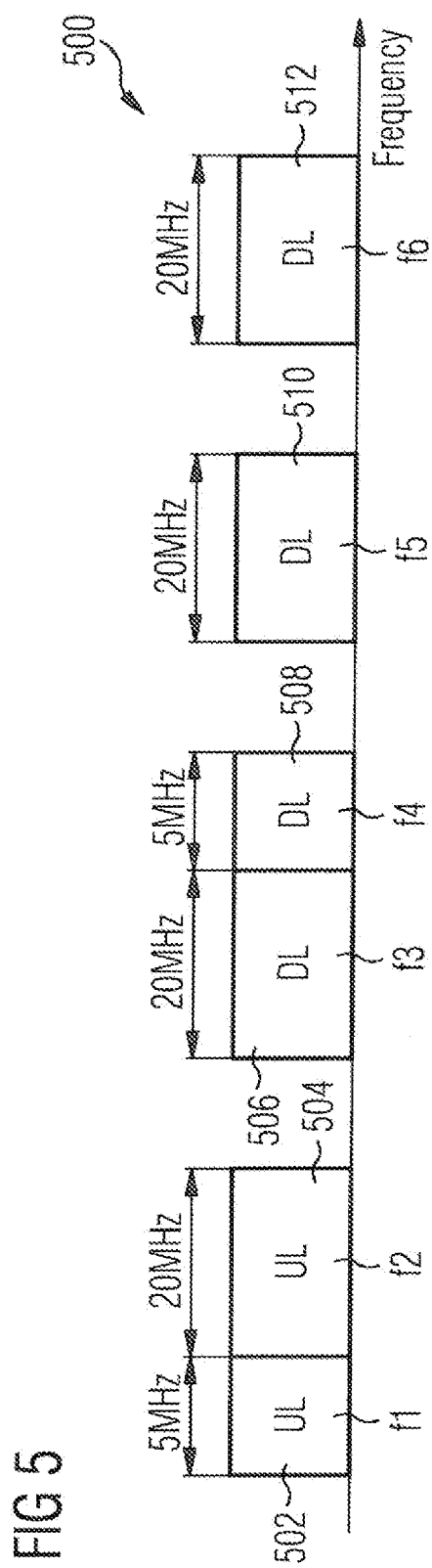
FIG. 5 shows an uplink and downlink frequency distribution in accordance with an embodiment of the invention.

FIG. 5 shows an uplink and downlink frequency distribution in accordance with an embodiment of the invention. In some embodiments, an LTE-A radio cell operates in full-duplex FDD mode. For uplink transmission of an LTE-A MCD, an overall 25 MHz is allocated with two adjacent frequency bands 502 and 504 with respective carrier frequencies f1 and f2. For downlink transmission of an LTE-A MCD, an overall 65 MHz are allocated consisting of four frequency bands: two adjacent bands 506 and 508 with respective carrier frequencies f3 and f4, and two non-adjacent bands 510 and 512 with respective carrier frequencies f5 and f6. For uplink transmission of an LTE MCD, 20 MHz is allocated via frequency band 504 with carrier frequency f2. For downlink transmission of an LTE MCD, 20 MHz is allocated via frequency band 506 with carrier frequency f3.

Although LTE MCDs and LTE-A MCDs operate over different bandwidths, downlink control information, PDCCH for example, is transmitted over the frequency band that both types of MCDs use, frequency band 506. This enables an LTE-A network to be backwards compatible with LTE MCD.

It will be understood that although specific frequency bands, bandwidth, and number of frequency bands were recited in describing FIG. 5, FIG. 5 is one possible configuration within the scope of the invention and that there may be many variations or additions to this configuration. Variations within the scope of the invention include, but are not limited to, frequency bands larger or smaller than 5 MHz and 20 MHz, control channel information being transmitted over multiple carrier frequencies, and a total number of carrier frequencies being more or fewer than six.

FIG. 6A shows a message sequence chart for multiband-operation in an LTE-A communication system in accordance with an embodiment of the invention. At 608, eNodeB 602 transmits PDCCH format 1 in a subframe over a 20 MHz frequency band for the downlink scheduling of LTE MCD 604. PDCCH format 1 allocates a definite number of resource blocks for the PDSCH within a 20 MHz frequency band. Upon detection of PDCCH format 1 in the first OFDMA symbols of the subframe, LTE MCD 604 adjusts the associated PDSCH reception in the remaining OFDMA symbols of the subframe according to the received PDCCH format 1 information. Adjustments may include modulation and coding scheme and HARQ process number.

At 610, eNodeB 602 transmits LTE-A PDCCH format 1, formatted in accordance with an embodiment of the invention, over the same 20 MHz frequency band for the downlink scheduling of LTE-A MCD 606. LTE-A PDCCH format 1 allocates a definite number of resource blocks for the PDSCH within downlink frequency bands with respective carrier frequencies f3, f4, and f5, as follows: Carrier frequency f3: N1 resource blocks; Carrier frequency f4: N2 resource blocks; Carrier frequency f5: N3 resource blocks.

Upon detection of LTE-A PDCCH format 1 in the first OFDMA symbols of the subframe, LTE-A MCD 606 adjusts the associated PDSCH reception in the remaining OFDMA symbols of the subframe according to the received PDCCH format 1 information.

FIG. 6B shows a message sequence chart for multiband-operation in an LTE-A communication system in accordance with an embodiment of the invention. The downlink scheduling of LTE MCD 616 and LTE-A MCD 618 is partly conducted through intermediate NodeRs 612 and 614. In this embodiment, NodeR2 614 is able to adapt, in the frequency and/or time domains, resource allocation transmissions.

At 620, eNodeB 611 transmits PDCCH format 1 over a 20 MHz frequency band to NodeR1 612 for the downlink scheduling of LTE MCD 616. PDCCH format 1 allocates a definite number of resource blocks RBs for the PDSCH within the 20 MHz frequency band. At 624, NodeR1 612 forwards the received PDCCH format 1 to LTE-MCD 616. Upon detection of PDCCH format 1 in the first OFDMA symbols of the subframe, LTE MCD 616 adjusts the associated PDSCH reception in the remaining OFDMA symbols of the subframe according to the received PDCCH format 1 information.

At 622, eNodeB 611 transmits LTE-A PDCCH format 4 to NodeR2 614 over the same 20 MHz frequency band for the downlink scheduling of LTE-A MCD 618. LTE-A PDCCH format 4 is formatted in accordance with an embodiment of the invention.

LTE-A PDCCH format 4 allocates a definite number of resource blocks for the PDSCH within downlink frequency bands with respective carrier frequencies f3, f4, and f5, as follows: Carrier frequency f3: N1 resource blocks; Carrier frequency f4: N2 resource blocks; Carrier frequency f5: N3 resource blocks. In addition, the RF transmission/reception bandwidth capability of LTE-A MCD 618, expressed as T MHz, is also included with LTE-A PDCCH format 4.

NodeR2 614 receives the PDCCH format 4 information and adapts the resource allocation, due to, for example, temporary bad channel conditions in frequency bands with respective carrier frequencies of f3 and f4. Another example for adaption the resource allocation is to evenly distribute the traffic load over all available carrier frequencies for reducing signal processing efforts at the transmitter and receiver. An example adaption by NodeR2 may then be as follows: Carrier frequency f5: M1 resource blocks; Carrier frequency f6: M2 resource blocks. At 626, NodeR2 614 transmits the adapted resource allocation on LTE-A PDCCH format 1 to LTE-A MCD 618.

Upon detection of LTE-A PDCCH format 1 in the first OFDMA symbols of the subframe, LTE-A MCD 618 adjusts the associated PDSCH reception in the remaining OFDMA symbols of the subframe according to the received PDCCH format 1 information.

It will be understood that although a specific number of frequency bands were recited in describing FIG. 6, it is only one possible configuration within the scope of the invention and that there may be many variations or additions to this configuration. For example, a relay node may transmit data more or fewer than six carrier frequencies. Further, a relay node may be able to transmit both PDCCH format 1 and LTE-A PDCCH format 1.

FIG. 7 shows a block diagram of an example architecture for wireless communication device 700 (WCD). As used herein, a wireless communication device is a device capable of receiving and/or transmitting signals over a wireless communication network. Examples include, but are not limited to, base stations, eNodeBs, relay stations, NodeRs, and mobile phones. WCD 700 includes processor 702, memory 704, transceiver 706, and network interface 708, connected by bus 710. In some embodiments, memory 704 may include random access memory 712, such as conventional DRAM, and non-volatile memory 714, such as conventional flash memory, for storing the firmware that operates WCD 700, as well as other parameters and settings that should be retained by WCD 700.

Transceiver 706 includes antenna 716, which is used for communication wirelessly with one or more MCDs and/or WCDs. In some embodiments, for example eNodeBs and NodeRs, network interface 708 connects the WCD 700 to the core network, and may be a conventional wired network interface, such as a DSL interface, an Ethernet interface, or a USB interface that connects to an external computer or network interface device for connection to the core network. Alternatively, network interface 708 may be a wireless network interface that communicates with the core network via a wireless local-area network, a wireless metropolitan area network, or a wireless wide area network.

It will be understood that the architecture shown in FIG. 7 is only one possible architecture for WCD 700, and that there may be many variations or additions to the architecture. For example, WCD 700 may include I/O devices, such as a display (not shown), a smart card interface, and a smart card (not shown), to verify that WCD 700 is authorized for operation, or a variety of indicator lights or LEDs (not shown), to indicate the current status of WCD 700.

In summary, an embodiment of the invention provides a method of transmitting data in a communication system that transmit control channel data of a first format over a control channel, wherein the control channel data of the first format conveys information related to data transmitted within a first frequency band. The method further transmits control channel data of a second format over the control channel, wherein the control channel data of the second format conveys information related to data transmitted over one or more frequency bands, the one or more frequency bands having a combined bandwidth equal or greater than the first frequency band.

In some embodiments, the one or more frequency bands include the first frequency band. In some embodiments, the control channel data of the first format is transmitted over the control channel with a first bandwidth, and the control channel data of the second format is transmitted over the control channel with the first bandwidth.

In some embodiments, the control channel data of the first format is transmitted over the control channel with a first carrier frequency, and the control channel data of the second format is transmitted over the control channel with the first carrier frequency.

In some embodiments, the control channel data of the first format is transmitted over the control channel with a first bandwidth, and the control channel data of the second format is transmitted over the control channel with a second bandwidth the second bandwidth being equal or greater than the first bandwidth.

In some embodiments, the control channel data of the first format is transmitted over the control channel with a first carrier frequency, and the control channel data of the second format is transmitted over the control channel with a second carrier frequency, the second carrier frequency being a different frequency than the first carrier frequency.

In some embodiments, the control channel data of the second format includes a carrier frequency field, the carrier frequency field being indicative of one or more carrier frequencies to be used in a transmission, and a physical resource block field, the physical resource block field being indicative of a number of physical resource blocks allocated to each one or more carrier frequencies to be used in the transmission.

In some embodiments, the control channel data of the second format includes a mobile communication device bandwidth field, the mobile communication device bandwidth field being indicative of a radio frequency transmission and/or reception bandwidth capability of a mobile communication device.

Some embodiments of the invention provide a wireless communication network, the wireless communication network including a first mobile communication device, the first mobile communication device operating over a first frequency band, a second mobile communication device, the second mobile communication device operating over one or more frequency bands, the one or more frequency bands having a combined bandwidth equal or greater than the first frequency band, a base station. The base station is configured to transmit control channel data of a first format over a control channel, wherein the control channel data of the first format conveys information related to data transmitted within the first frequency band. The base station is further configured to transmit control channel data of a second format over the control channel, wherein the control channel data of the second format conveys information related to data transmitted over the one or more frequency bands.

In some embodiments the one or more frequency bands includes the first frequency band. In some embodiments, the base station is further configured to transmit control channel data of the first format over the control channel with a first bandwidth, and transmit control channel data of the second format over the control channel with the first bandwidth.

In some embodiments the base station is further configured to transmit control channel data of the first format over the control channel with a first carrier frequency, and transmit control channel data of the second format over the control channel with the first carrier frequency.

In some embodiments, the base station is further configured to transmit control channel data of the first format over the control channel with a first bandwidth, and transmit control channel data of the second format over the control channel with a second bandwidth, the second bandwidth being equal or greater than the first bandwidth.

In some embodiments the base station is further configured to transmit control channel data of the first format over the control channel with a first carrier frequency, and transmit control channel data of the second format over the control channel with a second carrier frequency, the second carrier frequency being a different frequency than the first carrier frequency.

In some embodiments, the information related to data transmitted over the one or more frequency bands includes a carrier frequency field, the carrier frequency field being indicative of one or more carrier frequencies to be used in a transmission, and a physical resource block field, the physical resource block field being indicative of a number of physical resource blocks allocated to each one or more carrier frequencies to be used in the transmission.

In some embodiments, the information related to data transmitted over the one or more frequency bands further includes a mobile communication device bandwidth field, the mobile communication device bandwidth field being indicative of a radio frequency transmission and/or reception bandwidth capability of the second mobile communication device.

In some embodiments, the wireless communication network further includes a relay node. In some embodiments, the relay node is configured to receive control channel data of the second format, decode control channel data of the second format, reconfigure control channel data of the second format, wherein the reconfiguration alters the information related to data transmitted over the one or more frequency bands, re-encode control channel data of the second format, and transmit the control channel data of the second format.

Some embodiments of the invention provide a base station for transmitting control channels in a communication system. The base station is configured to generate control channel data of a first format, wherein the control channel data of the first format conveys information related to data to be transmitted within a first frequency band. The base station is further configured to generate control channel data of a second format, wherein the control channel data of the second format conveys information related to data to be transmitted over one or more frequency bands, the one or more frequency bands having a combined bandwidth equal or greater than the first frequency band. The base station is further configured to transmit control channel data of the first and second format over a control channel and transmit data in conformance with the control channel data of the first and second format.

Some embodiments of the invention provide a wireless communication device including a transceiver, a processor, and a memory unit communicatively connected to the processor. The memory unit includes computer code that when executed by the processor causes the wireless communication device to receive control channel data, and computer code that when executed by the processor causes the wireless communication device to dynamically interpret the control channel data. The control channel data includes a carrier frequency field, the carrier frequency field being indicative of one or more carrier frequencies to be used in a transmission and a physical resource block field, the physical resource block field being indicative of a number of physical resource blocks allocated to each one or more carrier frequencies to be used in the transmission.

In some embodiments, the control channel data further includes a mobile communication device bandwidth field, the mobile communication device bandwidth field being indicative of a radio frequency transmission and/or reception bandwidth capability of a mobile communication device.

In some embodiments, the wireless communication device is a relay node. In some embodiments, the relay node is configured to reconfigure control channel data of the second format. In some embodiments, the wireless communication device is a mobile communication device. In some embodiments, the wireless communication device is a base station.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An Evolved Node B (eNodeB), comprising:
   a processor;
   a memory unit communicatively coupled to the processor, the memory unit comprising computer code that when executed by the processor causes the eNodeB to generate control information related to resource allocation for a shared channel of a long term evolution (LTE) network or a LTE advanced (LTE-A) network, the control information grouped into a downlink control information (DCI) format, the DCI format to include a carrier frequency field to indicate allocation of one or more carrier frequencies to the LTE network or the LTE-A network and a physical resource block field to indicate, for each of the one or more carrier frequencies, a respective number of allocated physical resource blocks; and
   a transceiver communicatively coupled to the processor, the transceiver to transmit the control information in the DCI format over a physical downlink control channel (PDCCH) in a frequency band allocated to both the LTE network and the LTE-A network.

2. The eNodeB of claim 1, the memory unit comprising computer code that when executed by the processor causes the eNodeB to generate control information related to resource allocation for a physical downlink shared channel (PDSCH) of a LTE network or a LTE-A network.

3. The eNodeB of claim 1, the memory unit comprising computer code that when executed by the processor causes the eNodeB to generate control information related to resource allocation for a physical uplink shared channel (PUSCH) of the LTE network or the LTE-A network.

4. The eNodeB of claim 1, the one or more carrier frequencies to include a carrier frequency allocated to the LTE network, the allocated carrier frequency part of a 20 megahertz (MHz) frequency band.

5. The eNodeB of claim 1, the one or more carrier frequencies to include multiple carrier frequencies allocated to the LTE-A network, each carrier frequency part of a frequency band, the frequency bands having a combined bandwidth greater than 20 MHz.

6. The eNodeB of claim 1, comprising one or more antennas communicatively coupled to the transceiver.

7. An Evolved Node B (eNodeB), comprising:
   a processor to generate control information related to resource allocation for a shared channel of a long term evolution (LTE) network or a LTE advanced (LTE-A) network, the control information grouped into a downlink control information (DCI) format, the DCI format comprising a carrier indicator to indicate allocation of one or more carrier frequencies to the LTE network or the LTE-A network, and a physical resource block indicator to indicate, for each of the one or more carrier frequencies, a respective number of allocated physical resource blocks; and
   a transceiver communicatively coupled to the processor, the transceiver to transmit the control information in the DCI format over a physical downlink control channel (PDCCH) in a frequency band allocated to both the LTE network and the LTE-A network.

8. The eNodeB of claim 7, the processor to generate control information related to resource allocation for a downlink shared channel (DL-SCH) of the LTE network or the LTE-A network.

9. The eNodeB of claim 7, the processor to generate control information related to resource allocation for an uplink shared channel (UL-SCH) of the LTE network or the LTE-A network.

10. The eNodeB of claim 7, comprising one or more antennas communicatively coupled to the transceiver.

11. A wireless device, comprising:
    a processor to decode control information related to resource allocation for an uplink shared channel (UL-SCH) or a downlink shared channel (DL-SCH) of a long term evolution (LTE) network or a LTE advanced (LTE-A) network, the control information grouped into a downlink control information (DCI) format, the DCI format to include a carrier field to indicate allocation of one or more carrier frequencies to the LTE network or the LTE-A network and a physical resource block field to indicate, for each of the one or more carrier frequencies, a respective number of allocated physical resource blocks; and
    a transceiver communicatively coupled to the processor, the transceiver to receive the control information in the DCI format over a physical downlink control channel (PDCCH) in a frequency band allocated to both the LTE network and the LTE-A network.

12. The wireless device of claim 11, the processor to decode the control information related to resource allocation for a physical downlink shared channel (PDSCH) of the LTE network or the LTE-A network.

13. The wireless device of claim 11, the processor to decode control information related to resource allocation for a physical uplink shared channel (PUSCH) of the LTE network or the LTE-A network.

14. The wireless device of claim 11, comprising one or more antennas communicatively coupled to the transceiver.

* * * * *